W. J. BALDWIN.
APPARATUS FOR SEPARATING HEAVY PARTICLES FROM AIR AND OTHER GASES.
APPLICATION FILED SEPT. 26, 1907.
911,802.
Patented Feb. 9, 1909.
3 SHEETS—SHEET 1.
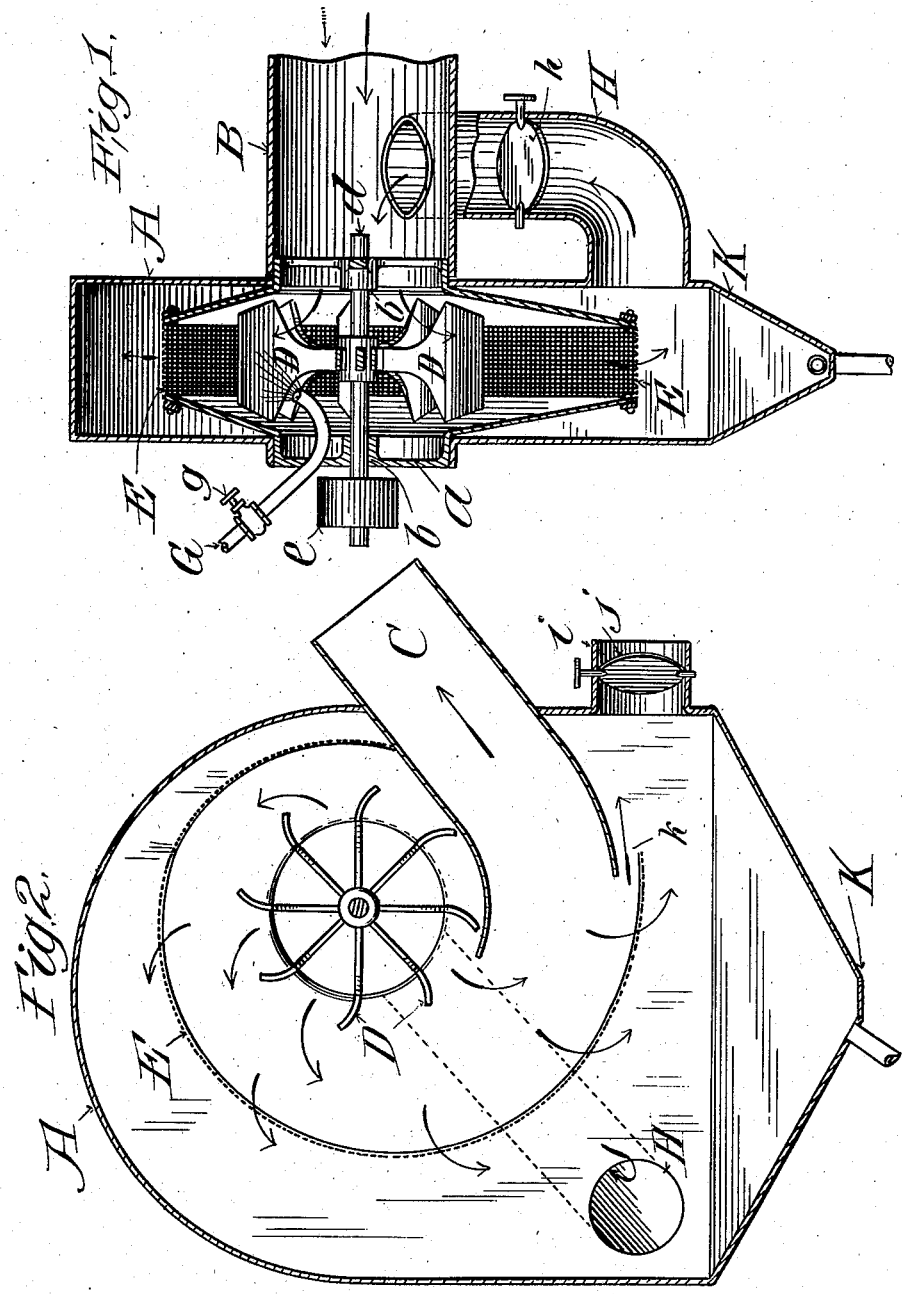

W. J. BALDWIN.
APPARATUS FOR SEPARATING HEAVY PARTICLES FROM AIR AND OTHER GASES.
APPLICATION FILED SEPT. 26, 1907.
911,802.
Patented Feb. 9, 1909.
3 SHEETS—SHEET 2.
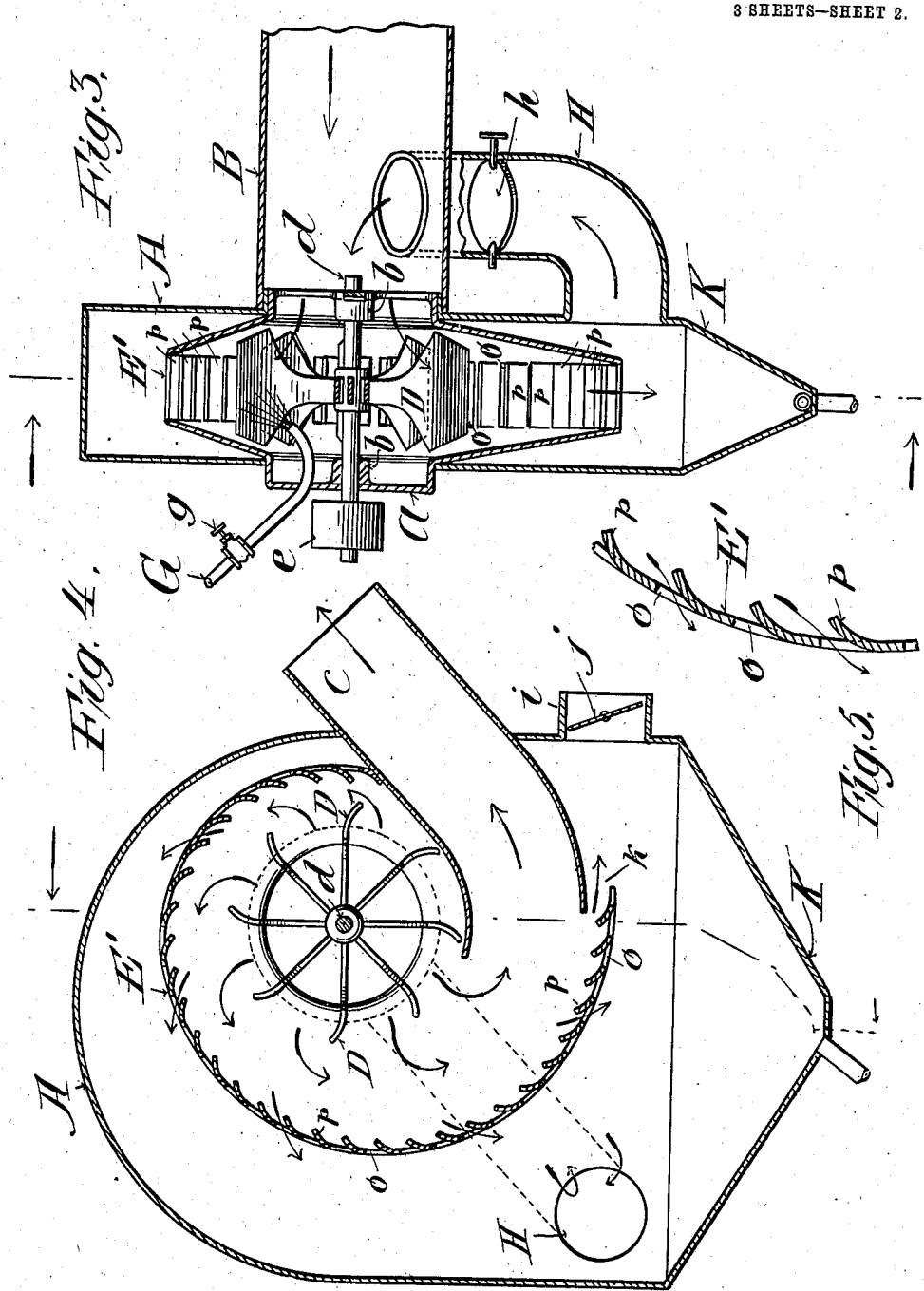

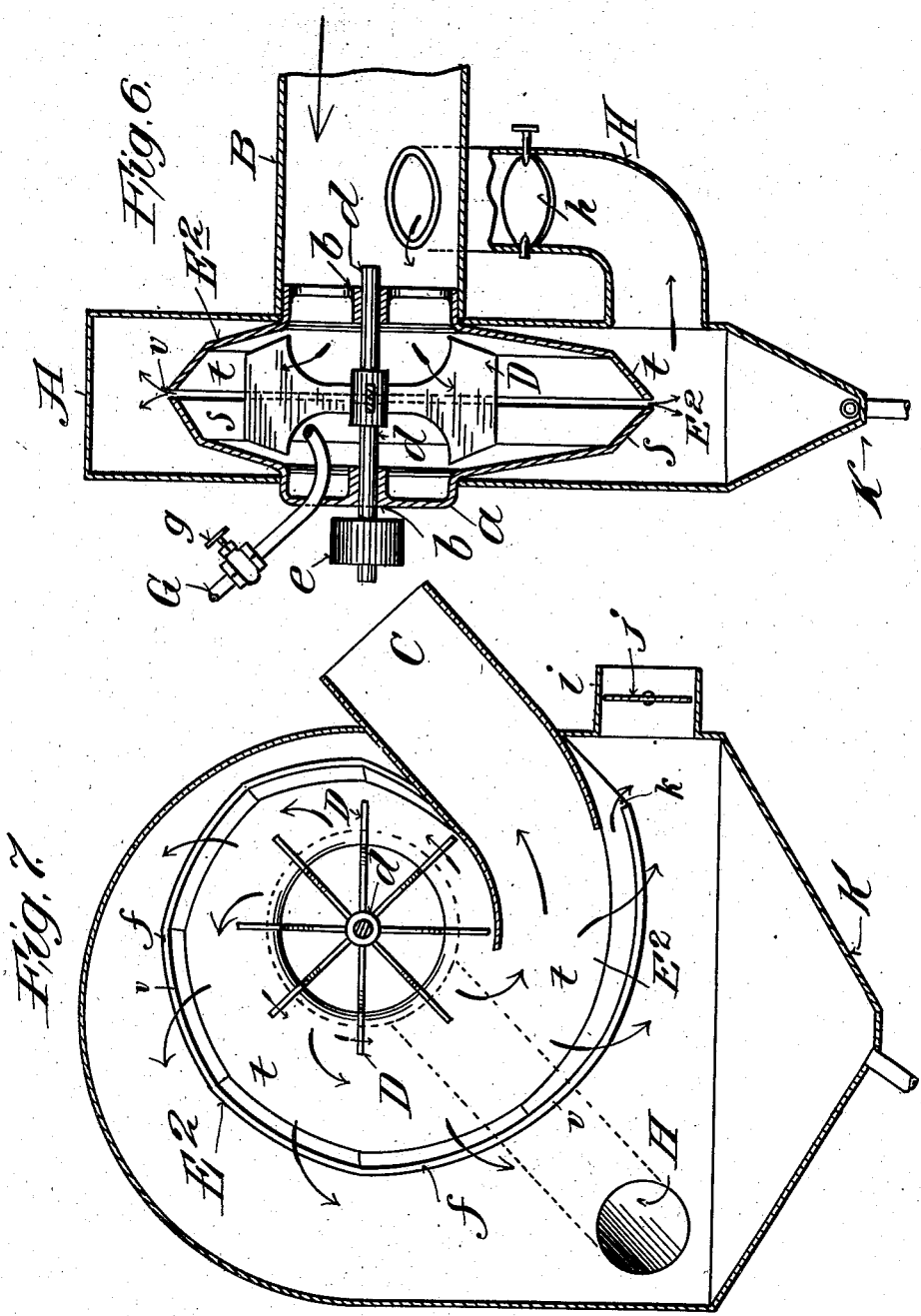

UNITED STATES PATENT OFFICE.

WILLIAM J. BALDWIN, OF NEW YORK, N. Y.

APPARATUS FOR SEPARATING HEAVY PARTICLES FROM AIR AND OTHER GASES.

No. 911,802.   Specification of Letters Patent.   Patented Feb. 9, 1909.

Original application filed March 7, 1907, Serial No. 361,099. Divided and this application filed September 26, 1907. Serial No. 394,653.

*To all whom it may concern:*

Be it known that I, WILLIAM J. BALDWIN, a citizen of the United States of America, and a resident of the borough of Brooklyn, in the city of New York, State of New York, have invented certain new and useful Improvements in Apparatus for Separating Heavy Particles from Air and other Gases, of which the following is a specification.

This invention relates to improvements in apparatus for separating heavy particles from air and other gases; the present application being a division of my application for improvements in the art of separating such particles from air and other gases, filed in the United States Patent Office, March 7, 1907, Serial Number 361,099 and now pending. In my said application, Serial Number 361,099, I set forth my improved process for effecting such separation, and the present application relates particularly to the preferred forms of apparatus for applying said process.

The apparatus is intended to be used for the separation of various heavy materials from air and other gases, as unconsumed carbon from smoke, dust from air, sawdust from the air of factories, tar and other heavy materials from coal gas and other gases; and in general the apparatus is intended to be applied to the separation of heavy materials from air and other gases in all cases in which the process can be used.

Referring to the drawings which illustrate several modifications of apparatus by which the said process may be performed, in order to indicate the essential features of such apparatus, which essential features are, however, not restricted to any of the various details of construction which are illustrated; Figure 1 is a transverse vertical section and elevation of one form of apparatus, in which the screen is wire mesh, and Fig. 2 is a side elevation and section of the same. Fig. 3 is a transverse vertical section and elevation of a modification of the apparatus in which the screen is formed with slits, and Fig. 4 is a side elevation and section of the same; Fig. 5 being an enlarged detail of a part of said screen. Fig. 6 is a transverse vertical section and elevation of the preferred form of the apparatus, in which the screen is provided with a slot, and Fig. 7 is a side elevation and section of the same.

Referring to Figs. 1 and 2, the device is set in a chamber A, which may be a casing as shown in the drawings, or may be a room in a building or any other suitable chamber. In said chamber A is a suitable fan or blower D on a shaft $d$, and driven at high velocity from a prime motor not shown. At a suitable distance from said fan D within said chamber A is a screen E, which in this modification is wire mesh suitably supported in said chamber A, and the mesh of said screen E is sufficiently large to permit the heavy particles to pass through. The inlet B connects with the space within said screen E, and a conduit G connected with any suitable supply, and controlled by a valve $g$, delivers a suitable liquid, such as water, oil, steam which on condensation becomes water, or other suitable liquid into the gas which contains the heavy materials. C is a discharge for the gas after the separation of the heavy materials and connected with the space within said screen E, and I prefer to leave a small space between the wall of said discharge C and said screen E, as seen at $k$, Fig. 2. Said inlet B is preferably connected with said chamber A by a pipe H controlled by a damper $h$, and I prefer to also provide said chamber A with an outlet $i$ controlled by a damper $j$, which outlet may be led to the discharge C or to any other desired place. Said chamber A may be provided with a connection K to any desired collecting vessel or chamber, for collecting the heavy materials which have been separated from the gas.

The operation is as follows: The atmospheric air or other gas containing the heavy materials enters the screen E by the inlet B, where it is set in rapid motion by the fan D and also encounters the liquid from pipe G, which enters as a spray and soon becomes thoroughly mixed with the heavy materials of the whirling gas, by which admixture said heavy materials are variously acted upon, according to the nature of the liquid and the materials, the mixture being termed "mud" by me for sake of brevity of description. This "mud" is projected against the screen E by the centrifugal effect of the fan D, and much of the "mud" flies directly through the meshes of said screen. What "mud" does not fly through will soon be forced through by the pressure of the gas, and of course, can not return into the gas, because said screen E and the outward pressure of the gas prevent. Some of the gas will pass through the screen E together with the "mud", but much of the gas will not pass there through, but will flow around the screen E and out at the discharge C, being freed from the heavy particles which, as hereinabove stated, have passed through the screen E as "mud". That portion of the gas which passed through the screen with the "mud" soon becomes freed from the "mud", because the latter drops down into the aforesaid receptacle, or trickles down the said screen E, and this portion of the air may be delivered by the pipe H to the inlet B, to be again acted on by the apparatus, or may be sent out by outlet $i$ into the discharge C, or to any other desired place. By regulating the opening of the dampers $h$, $j$, I can also regulate the quantity of air which will pass through the screen E.

The arrangement of the parts, and the operation of the apparatus illustrated in Figs. 3, 4 and 5, is substantially similar to that described. But the screen E' is now formed with slits $o$ between inclined lips or slats $p$, which may be conveniently formed by cutting suitable slits in the metal of which screen E' is made, and then bending in the edges as indicated. Or said slats may be separate pieces attached to the ends of the screen E'; and I find that the inclination of said slats $p$ is useful in certain cases in deflecting the "mud" through the screen.

Referring to Figs. 6 and 7, the screen E² is preferably made in two parts, $s$ and $t$, for convenience of manufacture, although it might be made in one piece, and with inclined sides to give direction to the heavy particles, and a slot $v$ in said screen E² extends around the greater part thereof, as indicated in Figs. 6 and 7. I find that screens of this shape and construction are very effective with certain classes of materials, producing an almost perfect separation of the heavy materials from the gas.

It will be evident from the foregoing description, that the screen may be formed of numerous materials and of different shapes and constructions, and therefore by the term "screen", as used in this application, I intend to cover any suitable diaphragm, wall, partition, or separating member, by which the separation of the heavy materials from gas can be effected.

Now having described my improvements, I claim as my invention.

1. The combination in apparatus for separating heavy material from gases, of a stationary chamber, a blower therein, a perforate screen in the path of the high velocity gas, an inlet thereto, a conduit adapted to deliver liquid into said gas, a discharge for the gas from the inside of said screen, and a connection from the space outside said screen to said inlet, substantially as described.

2. The combination in apparatus for separating heavy materials from gases, of a stationary chamber, a blower therein, a perforate screen in the path of the high velocity gas, an inlet to said chamber, a conduit adapted to deliver liquid into the gas, a discharge for gas from the space within said screen and a discharge for gas from the space without said screen, and means for controlling either of said discharges, substantially as described.

Signed at New York city this 23d day of September, 1907.

WILLIAM J. BALDWIN.

Witnesses:
JOHN A. BOLLES,
HENRY V. BROWN.